(12) United States Patent
Gadagkar et al.

(10) Patent No.: US 6,928,480 B1
(45) Date of Patent: Aug. 9, 2005

(54) NETWORKING DEVICE AND METHOD FOR PROVIDING A PREDICTABLE MEMBERSHIP SCHEME FOR POLICY-BASED VLANS

(75) Inventors: Manjiri S. Gadagkar, Sunnyvale, CA (US); Swati Dhuleshia, North Andover, MA (US); Luc Pariseau, Arlington, MA (US)

(73) Assignee: Nortel Networks Limited, St. Laurent (CA)

( * ) Notice: Subject to any disclaimer, the term of this patent is extended or adjusted under 35 U.S.C. 154(b) by 739 days.

(21) Appl. No.: 09/665,035

(22) Filed: Sep. 19, 2000

(51) Int. Cl.[7] .............................................. G06F 15/16
(52) U.S. Cl. ................. 709/227; 709/249; 370/395.53
(58) Field of Search ................................. 709/227, 228, 709/223, 224, 249; 370/395.53

(56) References Cited

U.S. PATENT DOCUMENTS

| | | | |
|---|---|---|---|
| 6,104,700 A * | 8/2000 | Haddock et al. ............ | 370/235 |
| 6,151,322 A * | 11/2000 | Viswanath et al. .... | 370/395.53 |
| 6,167,052 A * | 12/2000 | McNeill et al. ............ | 370/399 |
| 6,252,888 B1 * | 6/2001 | Fite et al. .................... | 370/466 |
| 6,430,621 B1 * | 8/2002 | Srikanth et al. ............ | 709/238 |
| 6,526,052 B1 * | 2/2003 | Rijhsinghani et al. ...... | 370/389 |

OTHER PUBLICATIONS

IEEE Standard 802.1Q, "IEEE Standards for Local and Metropolitan Area Networks: Virtual Bridged Local Area Networks", 1998, pp. 1-2, 23-36.*

* cited by examiner

Primary Examiner—William A. Cuchlinski, Jr.
Assistant Examiner—Joseph Maniwang
(74) Attorney, Agent, or Firm—Blakely Sokoloff Taylor & Zafman (57) ABSTRACT

A networking device and method for providing a predictable membership scheme for policy-based virtual local area networks (VLANs). In the event that identical behavior toward incoming expected and unexpected untagged frames is desired, a first membership scheme imposes a first set of rules while a second membership scheme, having a second set of rules, is used if expected and unexpected untagged frames are treated differently.

21 Claims, 5 Drawing Sheets

NETWORKING DEVICE AND METHOD FOR PROVIDING A PREDICTABLE MEMBERSHIP SCHEME FOR POLICY-BASED VLANS

FIELD OF THE INVENTION

The present invention relates to the field of data communications. More specifically, the present invention relates to a networking device and method for providing a predictable membership scheme for policy-based virtual local area networks (VLANs).

GENERAL BACKGROUND

The ability of users to access programs and to share data over a local area network (referred to as "LAN") has become a necessity for most working environments. Frequently, as the amount of data traffic over the LAN increases, efforts have been made reduce data traffic congestion. One technique involves separating the LAN into multiple LAN segments, using a networking device such as a bridge or network switch operating at a Media Access Control (MAC) sublayer of the Data Link layer (layer 2) of the International Standards Organization (ISO) Open Systems Interconnection (OSI) reference model. For this implementation, however, all networking devices connected to the LAN still belong to the same broadcast domain.

As the number of LAN segments and networking devices per segment increase, in many cases, the networking devices become overburdened processing broadcast data frames. Thus, under such circumstances, it is desirable to separate the growing data network into multiple broadcast domains. One possible approach for providing multiple broadcast domains is to configure the LAN with multiple virtual local area networks (VLANs).

In general, a "VLAN" is a logical local area network that can roughly be equated to a broadcast domain. A VLAN may comprise a plurality of networking devices, perhaps on multiple LAN segments, that are not constrained by their physical location. A network administrator determines the configuration of the VLAN based on a selected VLAN membership mechanism.

For example, the most common VLAN membership mechanism is to classify selected groups of ports for a networking device as VLANs. For example, a first group of ports may form one VLAN while a second group of ports may form another VLAN. This port-based VLAN membership mechanism has a number of disadvantages. In particular, it does not allow for multiple VLANs to share the same networking device port. Also, it requires the network administrator to reconfigure VLAN membership each time a networking device moves from one port to another.

An alternative solution is to utilize policy-based VLANs in which one or more ports are classified as a member of a VLAN if the contents of their incoming frames satisfy the policy associated with the VLAN. For example, if the "policy" for the VLAN is "protocol-based," those ports of the networking device that receive frames having a certain protocol are members of the VLAN. Besides protocol-based, examples of other types of "policy" include grouping based on source MAC address, source IP subnet and the like.

One problem associated with policy-based VLANs is that each and every port of a networking device may not be able to classify untagged frames based on the policy in question. For example, the networking device may include different application specific integrated circuits (ASICs) responsible for different ports. Both of these ASICs may support different VLAN capabilities. For example, one ASIC may support policy-based VLANs and the other ASIC may not. Thus, this may result in non-uniform classification of frames depending upon the port on which they are received.

SUMMARY

The invention relates to a networking device and method for providing a predictable membership scheme for policy-based virtual local area networks (VLANs). In the event that identical behavior toward expected and unexpected untagged frames is desired, a first membership scheme imposes a first set of rules for allowing or denying membership, changing the tagging option of a port, and changing the filtering option of the port. However, in the event that different behavior toward expected and unexpected untagged frames is desired, a second membership scheme may be utilized. This scheme imposes a second set of rules for allowing or denying membership and changing the tagging option of a port. These schemes provide greater accuracy in formulating VLANs than traditional techniques because it accounts for the classification for all types of frames, both untagged and tagged frames, as well as various tagging and filtering option changes.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which.

DETAILED DESCRIPTION OF THE INVENTION

Herein, the exemplary embodiments of the present invention relate to a networking device and method for providing a predictable membership scheme for policy-based virtual local area networks (VLANs). These embodiments are not exclusive; rather, they merely provide a thorough understanding of the present invention. Well-known circuits are not set forth in detail in order to avoid unnecessarily obscuring the present invention.

In the following description, certain terminology is used to describe features of the present invention. For example, a "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology). "Logic" includes hardware and/or software that perform a certain function on incoming information. The software may include a program featuring a collection of subprograms being executable code. Examples of a program include an operating system, an application or even an applet for example.

The term "information" is defined as data, address, and/or control. Information may be transferred over the link using at least two different types of frames, namely "tagged" or "untagged". In accordance with an Institute of Electrical and Electronics Engineers (IEEE) draft standard entitled "Draft Standard 802.1Q/D9 IEEE Standards for Local and Metropolitan Area Networks: Virtual Bridged Local Area Networks," published Feb. 20, 1998, a "tagged frame" is a sequence of bytes including a fixed-length field (referred to as a "tag header") that immediately provides the networking device with its VLAN identification information. The VLAN identification information identifies which particular VLAN the data within the frame will be routed. The "untagged frame" is a sequence of bytes that does not contain the tag header.

Figure 1:
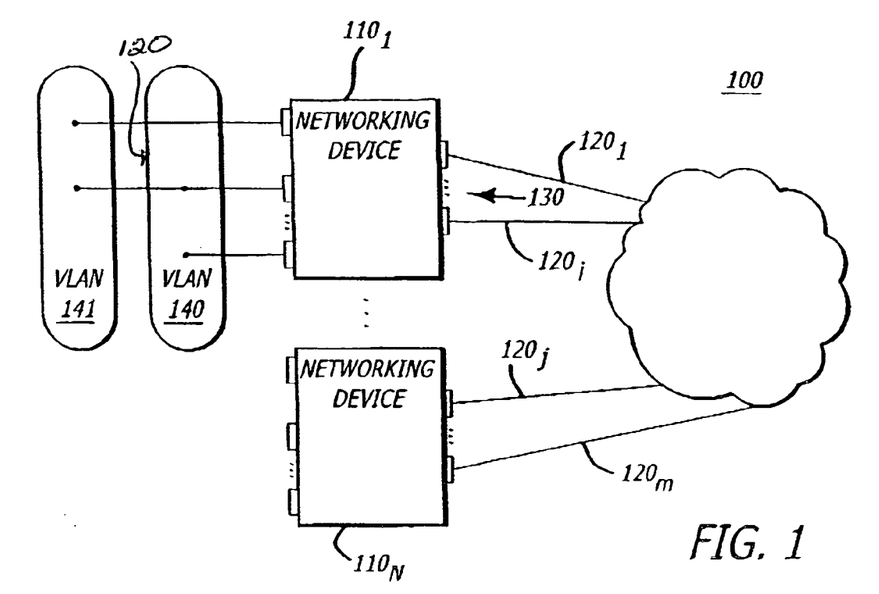
FIG. 1 is an exemplary embodiment of a network employing a plurality of virtual local area networks (VLANs).

Referring to FIG. 1, a first exemplary embodiment of a network 100 in accordance with the invention is illustrated. The network 100 comprises one or more (N) networking device $110_1$–$110_N$ that communicate with each other via links $120_1$–$120_M$ (where M≧N). Each "networking device" comprising processing logic (e.g., a processor, microcontroller, state machine, etc.) and a transceiver for receiving/transmitting information from/to another networking device. Examples of a networking device include a computer (e.g., server, mainframe, workstation, desktop, laptop, hand-held, etc.), communications equipment (e.g. a bridge, router, switch, etc.) and the like.

For this embodiment, one networking device $110_1$ featuring a first plurality of ingress ports 120 and a second plurality of egress ports 130 that output information to another networking device $110_2$. The ingress ports 120 can be members of one or more virtual local area networks (VLANs) such as VLANs 140 and 141, where VLAN 140 is based on a first policy and VLAN 141 is based on a different policy. Policies may include any guidelines or parameters to prioritize various types of data traffic (e.g., real-time video, e-mails, etc.). For example, VLAN 141 may include an Internet-Protocol (IP) based VLAN where all incoming IP frames are classified into VLAN 141.

Figure 2:
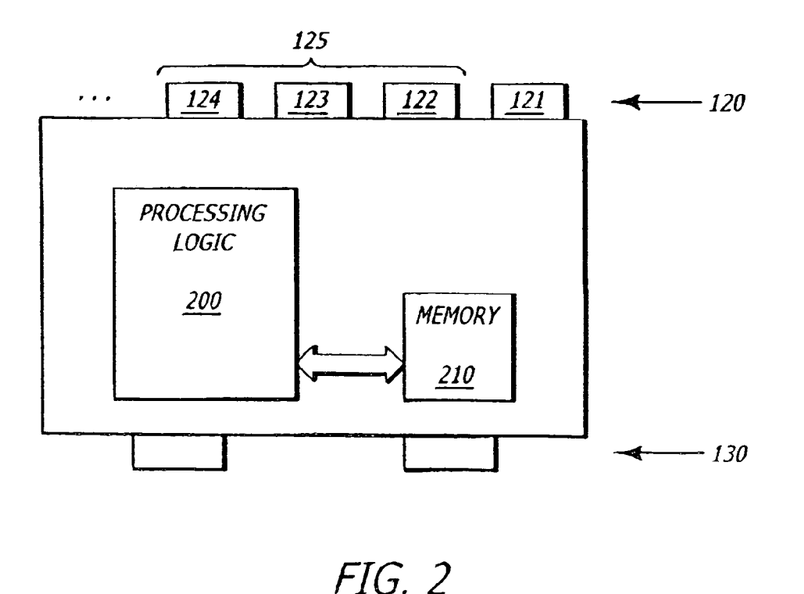
FIG. 2 is an exemplary embodiment of a networking device employed in the network of FIG. 1.

Referring now to FIG. 2, an exemplary embodiment of the networking device $110_1$ is shown. Networking device $110_1$ comprises ingress ports 120 and egress ports 130. The ingress ports 120 receive frames from a source such as another networking device. These frames may be tagged or untagged in accordance with the IEEE 802.1Q/D9 standard. As an illustrative example, a first ingress port 121 expects tagged frames only (e.g., ports 121 is a tag-only port) while a group 125 of ingress ports (e.g., ports 122–124) expect untagged frames. Moreover, for illustrative purposes, port 122 supports the first policy toward untagged frames but does not support the second policy toward untagged frames. Ports 123 supports the second policy, while port 124 supports both the first and second policies.

The networking device $110_1$ further comprises a processing logic 200 and a memory 210. The memory 210 may include non-volatile memory to contain software that controls a membership scheme for policy-based virtual local area networks (VLANs). Certain parameters used by the software may be modified from an external source (e.g., another networking device utilized by a network administrator) or may be self-modifiable based on dynamic changes to the network. Of course, in lieu of software, functionality to support the membership scheme may be implemented in hardware or firmware.

Figure 3:
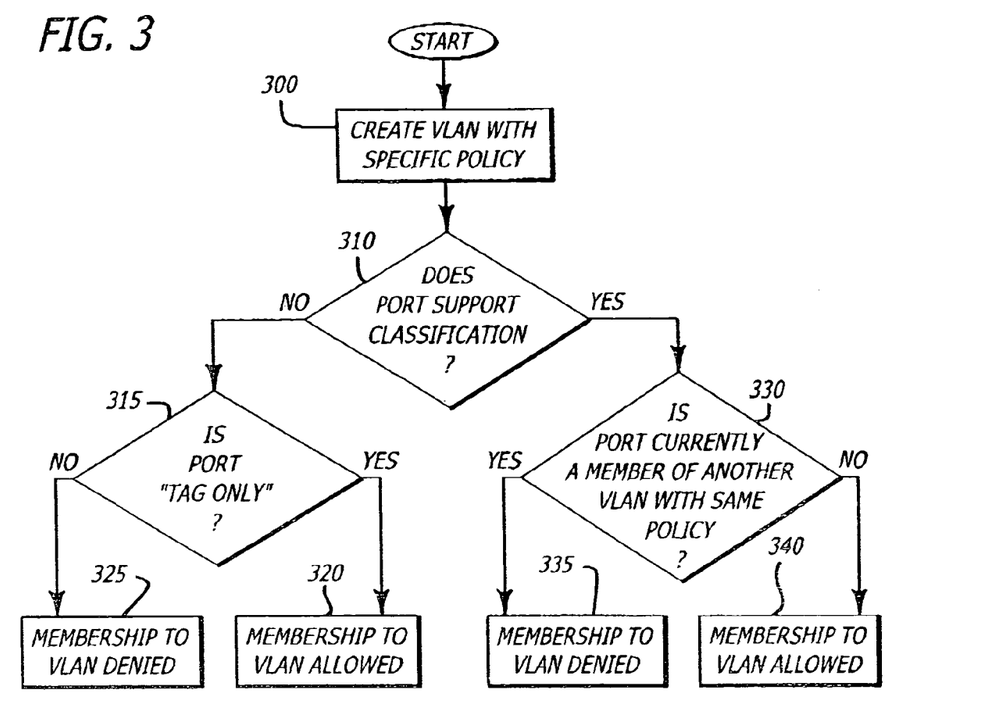
FIG. 3 is a first exemplary embodiment of a flowchart describing a method for allowing or denying membership to a policy-based VLAN in a predictable manner to ensure identical behavior toward expected and unexpected untagged frames.

Referring now to FIG. 3, a first exemplary embodiment of a flowchart describing a method for providing a predictable membership scheme for a policy-based VLAN of FIG. 1 is shown. This method is configured to ensure identical behavior toward expected and unexpected untagged frames for example.

Herein, a policy-based VLAN (e.g., VLAN 141) is created and the "policy" is specified (block 300). Since both tagged and untagged frames can pass through any of the ingress ports associated with the networking device of FIG. 2, a VLAN membership scheme may be implemented based on one or more of the following factors: (1) the capability of the port to classify untagged frames based on a particular policy; (2) the current "tagging" option of the port; and (3) the current "filtering" option of the port. From this scheme, VLAN membership for each port of the networking device is determined. A port is considered "tag-only" if the current "tagging" option is "tagged" and the current "filtering" option is "filter untagged frames". When a port is configured as "tag-only", it can be said that untagged frames are not expected on that port.

In particular, for this embodiment, a determination is made whether the port supports a particular policy classification (e.g., second policy) for untagged frames (block 310). This determination may be made either by the processing logic internally within the networking device itself or by logic within a device external to the networking device. If the port does not support that policy classification (e.g., ports 121 or 122 of FIG. 2), a determination is made whether the port is a "tag-only" port (block 315). If the port is a tag-only port (e.g., port 121 of FIG. 2), membership to the policy-based VLAN would be allowed (block 320). The reason for allowance of the membership is due to the fact that no untagged frames are expected to pass through the port. Otherwise, membership to the policy-based VLAN would be denied (block 325).

If the port supports the policy classification (e.g., ports 123 and 124 of FIG. 2), a determination is made whether the port is currently a member of another VLAN with the same policy (block 330). If so, membership to the policy-based VLAN would be denied because, while membership to multiple VLANs is permissible, membership to two VLANs based on the same policy is not (block 335). If the port is currently not a member of another VLAN with the same policy, then membership to the policy-based VLAN would be allowed (block 340).

Figure 4:
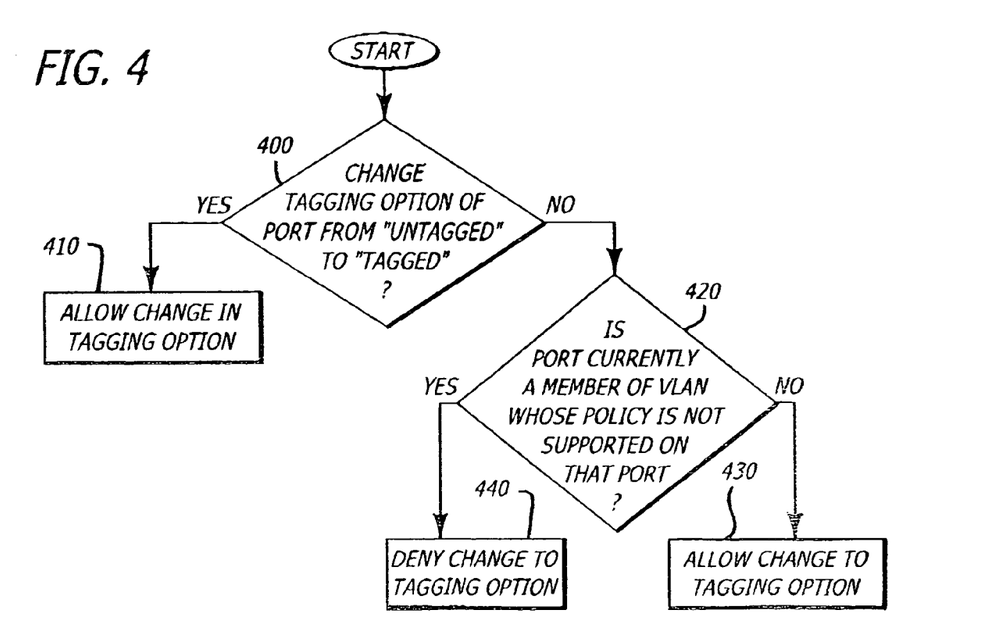
FIG. 4 is a first exemplary embodiment of a flowchart describing a method for allowing or denying a change in the tagging option of a port to ensure identical behavior toward expected and unexpected untagged frames.

With respect to FIG. 4, an exemplary embodiment of a flowchart describing a protocol for changing a "tagging" option of a port in accordance with the membership protocol of FIG. 3 is shown. A determination is made whether the change in the "tagging" option of the port is from an "Untagged" state to a "Tagged" state (block 400). Similarly, this determination may be made either by the processing logic internally within the networking device itself or by logic within a device external to the networking device. If the change in the tagging option places the port in a Tagged state, this change is allowed because the original Untagged state would not have allowed membership that poses restrictions on the change in question (block 410).

However, in certain situations as noted above, VLAN membership may be granted in light of the unexpected nature of untagged frames of a "tag-only" port. Thus, a change in a tagging option of the port from a Tagged state to an Untagged state requires a second determination; namely, whether the port is currently a member of any VLAN whose certain policy type for untagged frames is not supported (block 420). If the port is not a member of a VLAN whose policy type is not supported by this port for untagged frames, the change in the tagging option is allowed (block 430). Otherwise, the change in the tagging option is denied because this port is required to remain "tag-only" (block 440).

Figure 5:
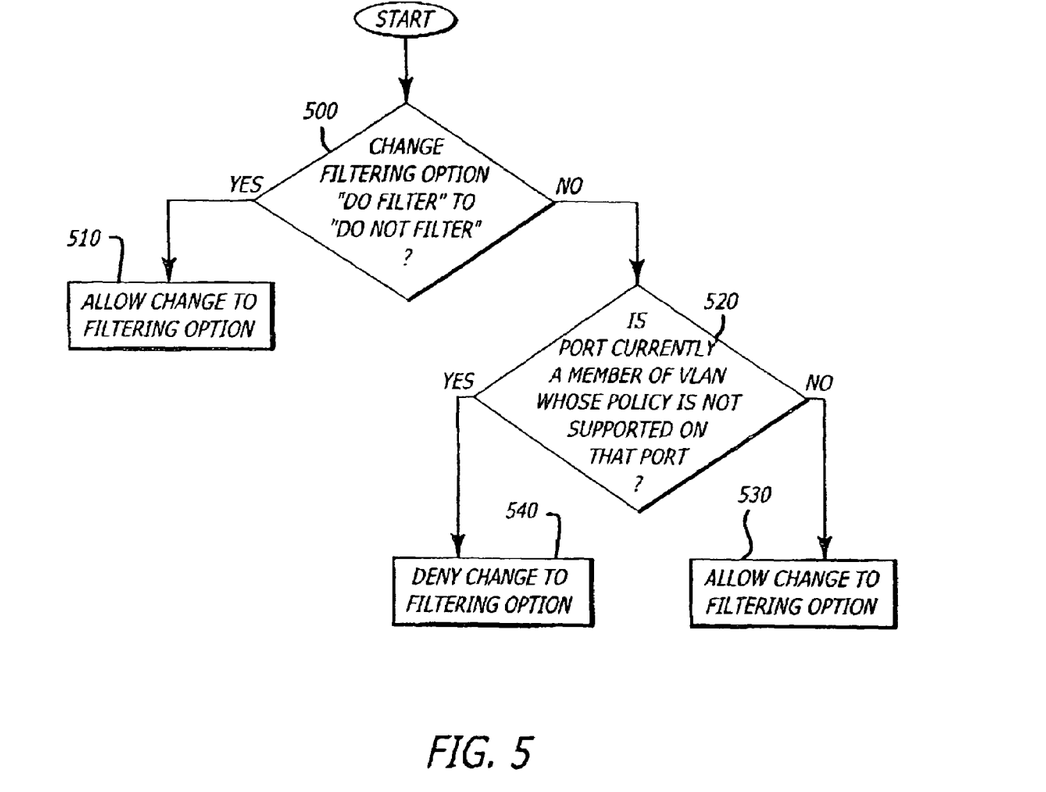
FIG. 5 is a first exemplary embodiment of a flowchart describing a method for allowing or denying a change in the filtering option of a port to ensure identical behavior toward expected and unexpected untagged frames.

With respect to FIG. 5, an exemplary embodiment of a flowchart describing a protocol for changing a "filtering" option of a port in accordance with the membership protocol of FIG. 3 is shown. A determination whether to allow a change in the filtering option is made either by the processing logic internally within the networking device itself or by logic within a device external to the networking device. The change in the filtering option is allowed when occurring from a "Do Not Filter" state to a "Do Filter" state (blocks 500 and 510).

If the filtering option is changed from a "Do Filter" state to a "Do Not Filter" state, a determination is made whether the port is a currently member of any VLAN whose policy for untagged frames is not supported (block 520). If the port is not a member of a VLAN whose policy type for untagged frames is not supported, the change in the filtering option is allowed (block 530). However, if the port is currently a member of a VLAN whose policy type for untagged frames is not supported, the change in the filtering option is denied (block 540).

Figure 6:
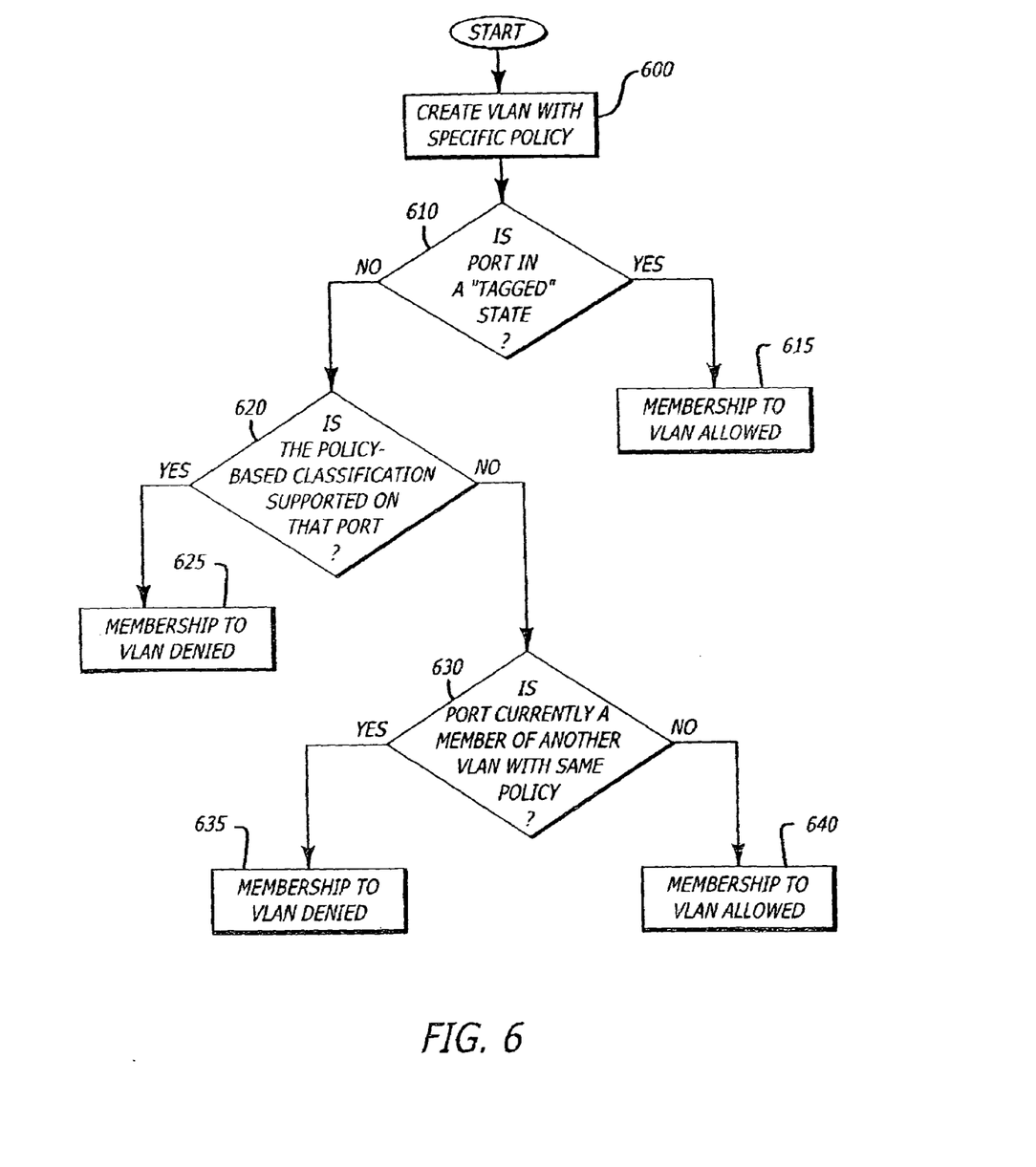
FIG. 6 is a second exemplary embodiment of a flowchart describing a method for allowing or denying membership to a policy-based VLAN in a predictable manner to ensure different behavior toward expected and unexpected untagged frames.

Referring now to FIG. 6, a second exemplary embodiment of a flowchart describing a method for providing a predictable membership scheme for a policy-based VLAN of FIG. 1 is shown. This method is configured to allow membership into multiple policy-based VLANs when untagged frames are not expected. This method employs different behavior toward expected and unexpected untagged frames. In this method, untagged frames are considered to be unexpected if the tagging option is "tagged". Herein, a policy-based VLAN is created and the "policy" is specified (block 600). Since both tagged and untagged frames can pass through the ingress ports associated with a VLAN, a mechanism may be implemented based on a port's capability to classify untagged frames based on the policy and its current "tagging" option.

In particular, for this embodiment, a determination is made whether the port is currently in a Tagged state (block 610). If so, membership to the VLAN is allowed and untagged frames will be classified based on a Port VLAN Identification (PVID) for this port (block 615). If the port currently in an Untagged state, a subsequent determination is made whether the port supports the policy-based classification of this VLAN (block 620). If the port does not support the policy-based classification of the VLAN, membership to the VLAN is denied (block 625). Otherwise, yet another subsequent determination is whether the port already is a member of another VLAN with the same policy (block 630). If so, membership to the VLAN is denied (block 635). If the port is not a member of another VLAN with the same policy, membership to the VLAN is allowed (block 640).

Figure 7:
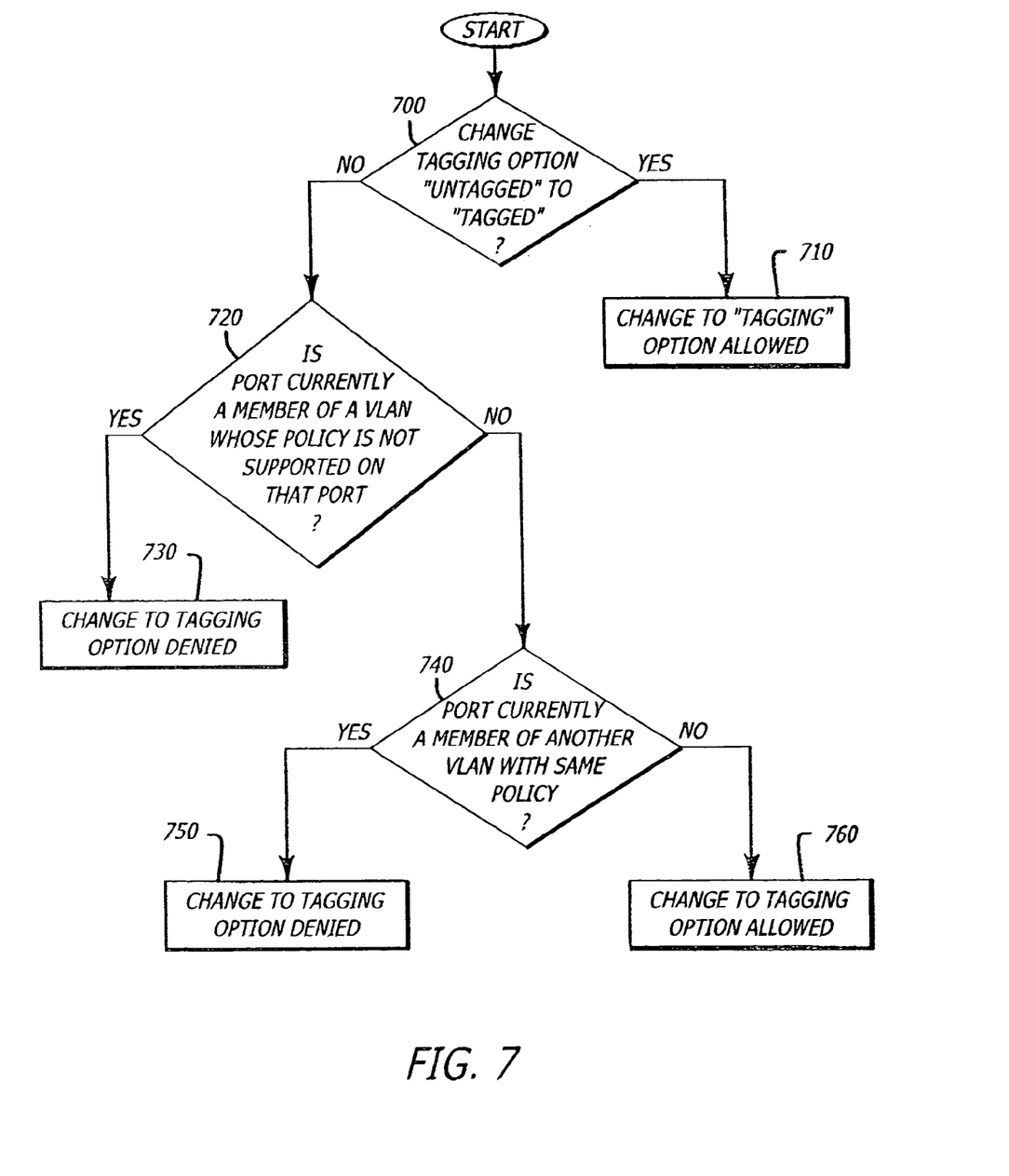
FIG. 7 is a second exemplary embodiment of a flowchart describing a method for allowing or denying a change in the tagging option of a port to ensure different behavior toward expected and unexpected untagged frames.

With respect to FIG. 7, an exemplary embodiment of a flowchart describing a protocol for changing a "tagging" option of a port in accordance with the membership protocol of FIG. 6 is shown. First, a determination is made whether the change in the tagging option is from an Untagged port to a Tagged port (block 700). If so, the change in the tagging option is allowed because the original Untagged state would not have allowed membership that poses restrictions on the change in question and all untagged frames will now be classified based on PVID (block 710). If not, a determination is made whether the port is a member of a VLAN whose policy type for untagged frames is not supported (block 720). If the port is a member of a VLAN whose policy type for untagged frames is not supported, the change in the tagging option is denied (block 730). If the port is not a member of a VLAN whose policy type for untagged frames is not supported, a determination is made whether the port already belongs to a VLAN having the same policy (block 740). If so, the change in the tagging option is denied (block 750). If not, the change in the tagging option is allowed so that untagged frames will now be considered for classification based on policy (block 760).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
    determining whether a predetermined policy followed by a first virtual local area network (VLAN) is supported by a port of a networking device;
    disallowing the port membership to the first VLAN if the port fails to support the predetermined policy;
    allowing the port membership to the first VLAN if the port fails to support the predetermined policy and the port constitutes a tag-only port; and
    disallowing the port membership to the first VLAN if the port supports the predetermined policy and is a current member of a second VLAN following the predetermined policy.

2. The method of claim 1 further comprising:
    allowing the port membership to the first VLAN if the port supports the predetermined policy and is not a current member of a second VLAN following the predetermined policy.

3. The method of claim 1, wherein the predetermined policy is associated with untagged frames.

4. The method of claim 1 further comprising:
    determining whether a change of a tagging option of the port is requested; and
    allowing the change in the tagging option from an untagged state to a tagged state.

5. The method of claim 1 further comprising:
determining whether a change of a filtering option of the port is requested; and
allowing the change in the filtering option from a "Do Not Filter" state to a "Do Filter" state.

6. A method comprising:
determining whether a predetermined policy followed by a first virtual local area network (VLAN) is supported by a port of a networking device;
disallowing the port membership to the first VLAN if the port fails to support the predetermined policy;
allowing the port membership to the first VLAN if the port fails to support the predetermined policy and the port constitutes a tag-only port;
determining whether a change of a tagging option of the port is requested;
allowing the change in the tagging option from an untagged state to a tagged state; and
disallowing the change in the tagging option if the change in the tagging option is from the tagged state to the untagged state and the port is a member of a second VLAN following the predetermined policy.

7. The method of claim 6 further comprising:
allowing the change in the tagging option if the change in the tagging option is from the tagged state to the untagged state and the port is not a member of the second VLAN following the predetermined policy.

8. A method comprising:
determining whether a predetermined policy followed by a first virtual local area network (VLAN) is supported by a port of a networking device;
disallowing the port membership to the first VLAN if the port fails to support the predetermined policy;
allowing the port membership to the first VLAN if the port fails to support the predetermined policy and the port constitutes a tag-only port;
determining whether a change of a filtering option of the port is requested;
allowing the change in the filtering option from a "Do Not Filter" state to a "Do Filter" state; and
disallowing the change in the filtering option if the change in the filtering option is from the "Do Filter" state to the "Do Not Filter" state and the port is a member of a second VLAN following the predetermined policy.

9. The method of claim 8 further comprising:
allowing the change in the filtering option if the change in the filtering option is from the "Do Filter" state to the "Do Not Filter" state and the port is not a member of the second VLAN following the predetermined policy.

10. A method comprising:
determining whether a port of a networking device is a tag-only port;
allowing membership of the port to a first virtual local area network (VLAN) if the port is a tag-only port;
determining whether a predetermined policy followed by the first VLAN is supported by the port; and
disallowing membership of the port to the first VLAN if the port supports the predetermined policy and the port is a member of a second VLAN following the predetermined policy.

11. The method of claim 10, wherein the predetermined policy is associated with untagged frames.

12. The method of claim 10 further comprising:
determining whether a change of a tagging option of the port is requested; and
allowing the change in the tagging option from an untagged state to a tagged state.

13. The method of claim 10 further comprising:
disallowing membership of the port to the first VLAN if the port fails to support the predetermined policy and the port is a member of a second VLAN following the predetermined policy; and
allowing membership of the port to the first VLAN if the port supports the predetermined policy and the port is not a member of the second VLAN following the predetermined policy.

14. A method comprising:
determining whether a port of a networking device is a tag-only port;
allowing membership of the port to a first virtual local area network (VLAN) if the port is a tag-only port;
determining whether a predetermined policy followed by the first VLAN is supported by the port;
disallowing membership of the port to the first VLAN if the port fails to support the predetermined policy and the selected port is a member of a second VLAN following the predetermined policy;
allowing membership of the port to the first VLAN if the port supports the predetermined policy and the port is not a member of the second VLAN following the predetermined policy;
determining whether a change of a tagging option of the port is requested;
allowing the change in the tagging option from an untagged state to a tagged state; and
disallowing the change in the tagging option if the change in the tagging option is from the tagged state to the untagged state and the port is a member of a second VLAN following the predetermined policy.

15. The method of claim 10 further comprising:
disallowing membership of the port to the first VLAN if the port fails to support the predetermined policy and the port is a member of a second VLAN following the predetermined policy; and
allowing membership of the port to the first VLAN if the port supports the predetermined policy and the port is not a member of the second VLAN following the predetermined policy.

16. A method comprising:
determining whether a predetermined policy followed by a first virtual local area network (VLAN) is supported by a port of a networking device;
determining whether a change of a filter option of the port is requested;
disallowing the change in the filtering option if (i) the change in the filtering option is from a "Do Filter" state to a "Do Not Filter" state, (ii) the port is a member of the first VLAN having a policy that fails to support untagged frames, and (iii) the port is a member of a second VLAN following the predetermined policy;
disallowing the port membership to the first VLAN if the port fails to support the predetermined policy and the port is a member of a second VLAN following the predetermined policy; and
allowing the port membership to the first VLAN if the port supports the predetermined policy and the port is not a member of the second VLAN following the predetermined policy.

17. A networking device comprising:
a plurality of ports; and
a processing unit to control membership of at least one of the plurality of ports to a policy-based virtual local area network (VLAN), the processing unit to determine whether a change of a tagging option of the at least one port is requested, allow the change in the tagging option if the tagging option is changed from an untagged state to a tagged state, and disallow the change in the tagging option if the change in the tagging option is from the tagged state to the untagged state and the at least one port is a member of another VLAN following a predetermined policy of the policy-based VLAN.

18. A networking device comprising:
a plurality of ports; and
a processing unit to control membership of at least one of the plurality of ports to a policy-based virtual local area network (VLAN), the processing unit further disallows membership to the policy-based VLAN if the at least one port supports the predetermined policy and is also a current member of another VLAN following the predetermined policy.

19. The networking device of claim 18, wherein the processing unit further disallows the at least one port of the plurality of ports membership to the policy-based VLAN if the at least one port fails to support the predetermined policy.

20. The networking device of claim 18, wherein the predetermined policy is associated with untagged frames.

21. A program loaded in memory of a networking device for execution therein, the program comprising:
a first subprogram to determine whether a predetermined policy followed by the policy-based VLAN is supported by a port of a networking device; and
a second subprogram to disallow the at least one port of the plurality of ports membership to the policy-based VLAN if the at least one port supports the predetermined policy and is also a current member of another VLAN following the predetermined policy.

* * * * *